United States Patent
Matheson et al.

(10) Patent No.: US 11,741,447 B1
(45) Date of Patent: Aug. 29, 2023

(54) AUTOMATED PURCHASING SYSTEMS AND METHODS

(71) Applicant: United Services Automobile Association (USAA), San Antonio, TX (US)

(72) Inventors: Cory A. Matheson, Celina, TX (US); Curtis Mark Bell, San Antonio, TX (US); Ashley Raine Philbrick, San Antonio, TX (US); Nathan Lee Post, Rockport, TX (US); Noe Alberto Martinez, San Antonio, TX (US); David M. Jones, Jr., San, TX (US); Oscar Guerra, San Antonio, TX (US); Janelle Denice Dziuk, Falls City, TX (US); Zachery C. Lake, Aubrey, TX (US); Yevgeniy Viatcheslavovich Khmelev, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/035,063

(22) Filed: Sep. 28, 2020

Related U.S. Application Data (60) Provisional application No. 62/908,278, filed on Sep. 30, 2019.

(51) Int. Cl.
  *G06Q 20/20* (2012.01)
  *B62B 3/14* (2006.01)

(52) U.S. Cl.
  CPC ......... *G06Q 20/202* (2013.01); *B62B 3/1408* (2013.01); *G06Q 20/206* (2013.01)

(58) Field of Classification Search
  None
  See application file for complete search history.

(56) References Cited

U.S. PATENT DOCUMENTS

| | | | | |
|---|---|---|---|---|
| 2008/0103939 | A1* | 5/2008 | Gibb | G06Q 10/087 705/28 |
| 2014/0201042 | A1* | 7/2014 | Meyer | G06Q 10/087 705/28 |
| 2015/0127496 | A1* | 5/2015 | Marathe | G06Q 10/087 705/28 |
| 2016/0307181 | A1* | 10/2016 | Syed | G06K 7/1404 |

(Continued)

Primary Examiner — Nathan C Uber
Assistant Examiner — Kimberly S. Bursum
(74) Attorney, Agent, or Firm — Fletcher Yoder, P.C.

(57) ABSTRACT

Disclosed herein are embodiments of systems, methods, and products comprises a server for enabling automatic shopping. The server may associate a shopping cart with a customer's electronic user device. The server may monitor the locations of the electronic user device. Based on the customer's location, the server may identify the shelves and items the customer has visited. When an item is lifted from the shelf, at least one weight sensor on the shelf may detect the weight change. The server may receive a notification comprising an amount of weight change from the weight sensor on the shelf. When the customer places the item into his/her shopping cart, the weight sensor on the shopping cart may detect the weight addition. If the weight change and weight addition match, the analytic server may determine that the item picked up from the shelf is placed within the customer's shopping cart.

21 Claims, 3 Drawing Sheets

(56) References Cited

U.S. PATENT DOCUMENTS

| | | | |
|---|---|---|---|
| 2017/0091850 A1* | 3/2017 | Alvarez | H04B 5/0062 |
| 2017/0169440 A1* | 6/2017 | Dey | H04W 4/33 |
| 2019/0057435 A1* | 2/2019 | Chomley | B62B 3/14 |
| 2019/0215424 A1* | 7/2019 | Adato | G06F 16/583 |
| 2019/0337549 A1* | 11/2019 | Lobo | G06K 9/00288 |
| 2020/0097940 A1* | 3/2020 | Uchimura | G06Q 20/208 |
| 2021/0148751 A1* | 5/2021 | Yadai | G01G 19/52 |
| 2021/0378315 A1* | 12/2021 | Hashimoto | H04W 4/021 |

* cited by examiner

AUTOMATED PURCHASING SYSTEMS AND METHODS

CROSS-REFERENCE TO RELATED APPLICATIONS

This application claims priority to and the benefit of U.S. Provisional Application No. 62/908,278, filed on Sep. 30, 2019, and entitled "AUTOMATED PURCHASING SYSTEMS AND METHODS," the disclosure of which is incorporated by reference herein for all purposes.

TECHNICAL FIELD

This application relates generally to automated purchasing systems and methods.

BACKGROUND

The development of Internet of things (IoT) technologies has brought a new revolution in the retail industry, which has a growing need to increase customer loyalty and to deliver an improved in-store experience. For example, the retail industry may use IoT technologies to provide a more efficient shopping experience, where items that are placed in a shopping cart can be automatically recognized, and customers can be billed accordingly. As a result, customers can avoid long queuing time at the checkout points.

Conventional methods for shopping using IoT technologies may be expensive and computationally inefficient. For example, some conventional methods for automatic shopping may use video surveillance cameras as IoT sensors in retail environments to track how customers move around in the shopping space. The surveillance cameras and sensors may keep track of a customer's movements, every product picked up and then placed in a bag/shopping cart, every label read and product replaced on the shelf, every hesitation, head nod, and the like. Retailers may gather enormous amount of data and monitor customers to provide such a shopping experience.

Such conventional methods may require a large number of expensive surveillance cameras to be installed to cover every corner of the shopping space. Furthermore, the processing of the collected video data may include image recognition and face recognition, which may be power consuming and computational complex. Because of these technical shortcomings, stores utilizing conventional systems cannot accommodate multiple shoppers simultaneously walking around the shopping space and placing various items in their shopping carts. For instance, performing simultaneous and continuous facial recognition on multiple shopper in a crowded shopping isle is costly, inefficient, and may lead to inaccurate results. Therefore, stores utilizing conventional methods may only allow a limited number of customers in the shopping space. In addition, the surveillance cameras may pose security and privacy threats. Customers may have concerns regarding their privacy and may be uncomfortable about being monitored closely, which will inevitably lead to a negative user experience.

Some other conventional methods may use RFID (radio-frequency identification) tags to provide an automatic shopping experience. For instance, each item may have an RFID tag. As a customer picks up items and places the items in a shopping cart, the item's RFID tag may be automatically scanned by a RFID reader installed on a smart shelf or a smart cart. As a result, the retailer may provide an automatic shopping experience by automatically recognizing the items in a shopping cart based on the RFID tags. Such conventional methods may require an RFID attached to every single item, which is undesirable and expensive.

SUMMARY

For the aforementioned reasons, what is needed is a system and method to automatically recognize items put in a shopping cart without requiring heavy computational resources, without requiring accumulation of extensive amounts of data, and without requiring expensive hardware devices. Embodiments disclosed herein address the above challenges by providing a system and method for recognizing the purchased items using weight sensors installed in shelves and shopping carts. Using the methods and systems disclosed herein, a store may provide an efficient automatic shopping experience while needing fewer hardware devices than required by the conventional methods and systems, which in turn increases efficiency of purchasing.

The weight sensors are low-cost devices collecting (i.e., sensing) weight changes at shelves and shopping carts. The weight sensors may be installed in predetermined locations of shelves. Based on the sensed weight change in a specific location of the shelf, a server may be able to determine the identifier of the item being picked up from the shelf. The weight sensor in a shopping cart may detect a weight addition when an item is placed in the shopping cart. By matching the weight lifted from a shelf with the weight added into a shopping cart, the server may determine that the item picked up from the shelf is placed into the shopping cart. Based on the identifier of the item, the server may automatically recognize the item placed in the shopping cart.

Furthermore, the server may need to correlate the customer with the items picked up from the shelf and placed in the shopping cart. For example, the server may need to identify who picked up the item from the shelf and placed the item in which cart. To do so, the server may associate the shopping cart with an electronic device of the customer. The server may also monitor the customer's location by periodically receiving location identification signal from the customer's electronic device. Based on the location of the customer, the server may determine the items and/or shelves located within a proximity of the customer. For example, the server may determine that the customer is near the shelf holding sparkling water. When the customer picks up a case of sparkling water and places the sparkling water in his/her shopping cart, the weight sensor of the associated shopping cart may detect the weight addition. The weight sensor of the shelf holding sparkling water may detect the weight change too. The server may receive the weight addition from the weight sensor on the shopping cart associated with the customer. The server may also receive the weight change from the weight sensor on the shelf the customer has visited (e.g., the shelf within the proximity of the customer's location). The server may compare the weight addition and the weight change. If they match, the server may determine that the user has placed the item in his/her cart. Based on the specific location of the weight sensor that detects the weight change, the server may determine the identifier of the item. As a result, the server may determine what product the customer has placed in his/her shopping cart. Therefore, the methods and systems described herein provide an automatic shopping experience based on low-cost weight sensors.

The weight sensors are only installed in predetermined locations of the shelves and the shopping carts. The number of required weight sensors is limited. Comparing with the RFID tags attached to every single item in conventional methods, the number of weight sensors is significantly less. In addition, the weight sensors are low-cost. Comparing with the expensive surveillance cameras in the conventional methods, the weight sensors are more cost-efficient. Because the weight sensors do not perform face recognition and image recognition, the systems and methods described herein are more computation efficient and less power consuming. Furthermore, because the weight sensors do not collect the customers' image data, the systems and methods described herein are more secure and introduce less privacy concerns.

In one embodiment, a method comprises associating, by a server, a shopping cart of a store with an electronic device upon the electronic device scanning a label on the shopping cart comprising an identifier of the shopping cart, the shopping cart having a first weight sensor configured to sense a weight addition associated with each item placed within the shopping cart; monitoring, by the server, locations of the electronic device by periodically receiving, from the electronic device, location identification signals; identifying, by the server, a shelf holding one or more items located within a first predetermined proximity of the electronic device based on the locations of the electronic device, the shelf having a set of second weight sensors installed in different sections of the shelf and configured to detect a weight change upon each item on the shelf is lifted; receiving, by the server, a notification comprising an amount of weight change from a second weight sensor within the set of second weight sensors, the amount of weight change associated with an item being lifted from the shelf; receiving, by the server, an indication comprising an amount of weight addition from the first weight sensor; when the amount of weight change matches the amount of weight addition, identifying, by the server, an identifier of the item being lifted from the shelf based on the section of the shelf where the second weight sensor is installed, wherein the server determines that the item being lifted from the shelf is placed within the shopping cart; when the electronic device is within a second predetermined proximity to an exit of the store based on the locations of the electronic device, determining, by the server, a payment amount based on identifiers of items placed within the shopping cart; and transmitting, by the server, the payment amount from a first account associated with a user operating the electronic device to a second account of a merchant associated with the store.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide automated retail systems and methods. Specifically, an analytic server may automatically determine the identifier of an item being picked up from a shelf. For example, the analytic server may determine what items are picked up from shelves. The analytic server may also determine which customer picked up the item from the shelf and whether the item is placed within the customer's shopping cart. Thus, the analytic server may need to correlate the customer with the item picked up from the shelf and placed in the shopping cart. The analytic server may use weight sensors installed in the shelves and the shopping carts to determine whether an item picked up from the shelf is placed within a shopping cart. Furthermore, the analytic server may monitor the customer's locations (e.g., by receiving GPS signals from the customer's cell phone) to determine which shelves/items the customer has visited. When the customer picks up an item, the shelf weight sensor associated with that item may transmit a weight change notification to the analytic server. Based on the location of the user and the weight change notification, the analytic server may determine the identifier of the item the customer has picked up. The analytic server may also associate the customer's electronic user device (e.g., cell phone) with a shopping cart. When the customer places an item in the shopping cart, the shopping cart weight sensor may transmit a weight addition indication to the analytic server. When the weight change matches the weight addition, the analytic server may determine that the customer picks up the identified item from the shelf and places the item in his/her shopping cart. Based on this process, the analytic server may automatically determine the items purchased by the customer.

Figure 1:
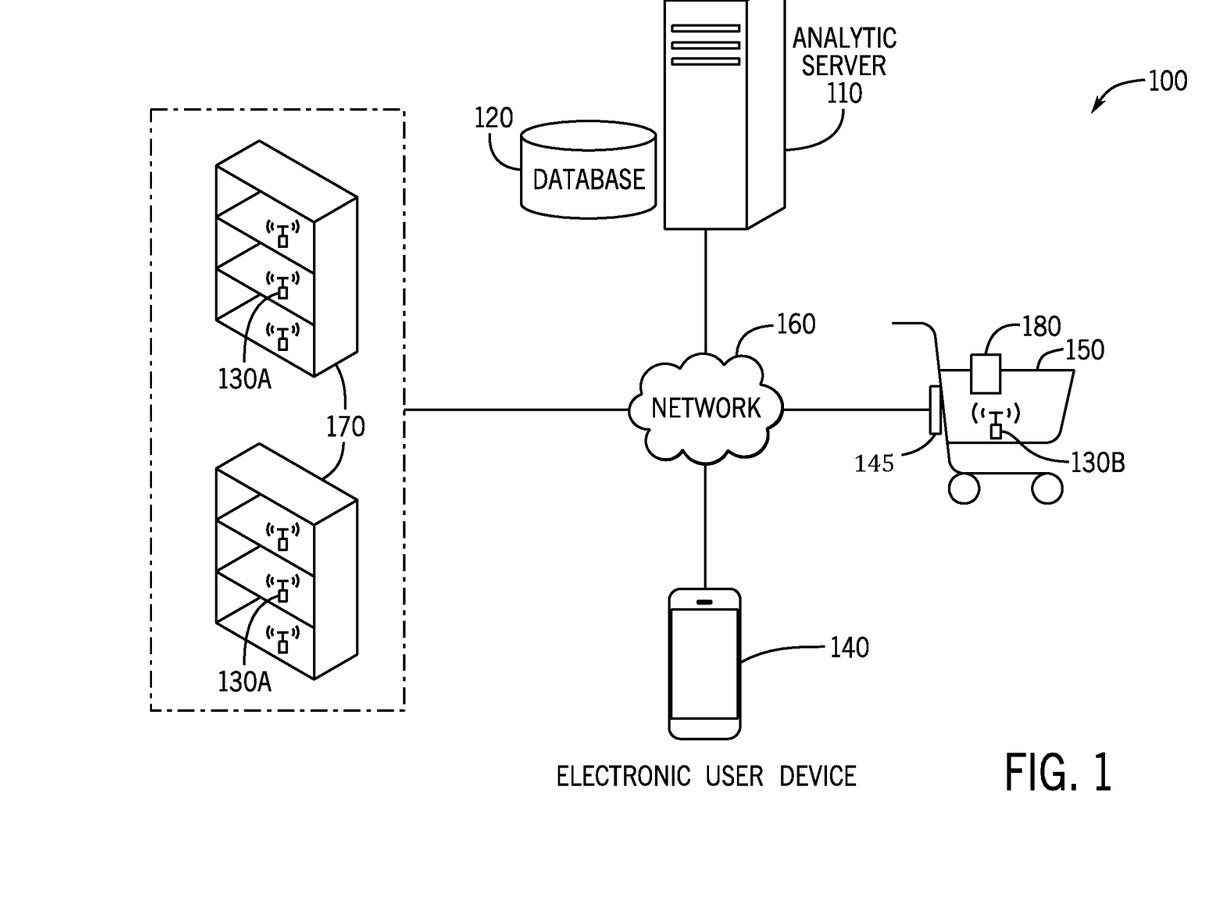
FIG. 1 illustrates a computer system for automatic shopping, according to an embodiment.

FIG. 1 illustrates components of a system 100 for automatic shopping, according to an embodiment. The system 100 may comprise an analytic server 110, e.g., a controller, a database 120, a set of weight sensors 130A on shelves, one or more weight sensors 130B on each shopping cart, and an electronic user device 140, that are connected with each other via hardware and software components of one or more networks 150. Examples of the network 150 include, but are not limited to, Local Area Network (LAN), Wireless Local Area Network (WLAN), Metropolitan Area Network (MAN), Wide Area Network (WAN), and the Internet. The communication over the network 150 may be performed in accordance with various communication protocols, such as Transmission Control Protocol and Internet Protocol (TCP/IP), User Datagram Protocol (UDP), and IEEE communication protocols.

The analytic server 110 may be any computing device comprising a processor and other computing hardware and software components. The analytic server 110 may be logically and physically organized within the same or different devices or structures, and may be distributed across any number of physical structures and locations (e.g., cabinets, rooms, buildings, cities).

The analytic server 110 may be a computing device comprising a processing unit. The processing unit may include a processor with computer-readable medium, such as a random access memory coupled to the processor. The analytic server 110 may be running algorithms or computer executable program instructions, which may be executed by a single processor or multiple processors in a distributed configuration. The analytic server 110 may be configured to interact with one or more software modules of a same or a different type operating within the system 100.

Non-limiting examples of the processor may include a microprocessor, an application specific integrated circuit, and a field programmable object array, among others. Non-limiting examples of the analytic server 110 may include a server computer, a workstation computer, a tablet device, and a mobile device (e.g., smartphone). Some embodiments may include multiple computing devices functioning as the analytic server 110. Some other embodiments may include a single computing device capable of performing the various tasks described herein.

The analytic server 110 may require the electronic user device 140 to be associated with a shopping cart of a store. For example, when a customer comes to a store and launches an automatic shopping application on the electronic user device 140, the application may require the user to pair with a shopping cart of the store. Each shopping cart may have a label including an identifier embodied in a barcode, a pin code, and/or a QR (quick response) code. To associate with the shopping cart, the automatic shopping application may require the user to scan the barcode, pin code, or QR code using the electronic user device 140. The automatic shopping application may be a web application (e.g., comprising a hyperlink of a website) and/or a mobile application installed in the electronic user devices 140. In some embodiments, the shopping cart may be a basket, a bag, a case, a bin, a box, and the like.

The analytic server 110 may require the customer to register with the automatic shopping application. In the registration process, the analytic server 110 may require the customer to input user identifier data, including user name, user address, user payment information (e.g., credit card information), user contact information, and the like. By associating the customer with the shopping cart, the analytic server 110 may be able to associate the items in the shopping cart with the customer, and identify the products purchased by the customer.

The electronic user device 140 may be any computing device allowing a customer to interact with the analytic server 110. The electronic user device 140 may be any computing device comprising a processor and non-transitory machine-readable storage medium. The examples of the computing device may include, but are not limited to, a personal digital assistant (PDA), a smartphone, a tablet computer, and the like. The electronic user device 140 may be a mobile device or handheld computer that provide a touchscreen interface with digital buttons and keyboard or physical buttons along with a physical keyboard. The electronic user device 140 may comprise integrated cameras, digital media players, and the global positional system (GPS) capabilities. The electronic user device 140 may connect to the network 160 and interconnect with other devices, such as beacons, sensors, via Wi-Fi, Bluetooth, cellular networks, near field communication (NFC), and the like. The electronic user device 140 may comprise any number of input and output devices supporting various types of data, such as text, image, audio, video, and the like. The electronic user device 140 may run mobile operating systems that allow third-party applications to be installed and run. For example, the electronic user device 140 may install the automatic shopping application provided by the analytic server 110.

A customer/user operating the electronic user device 140 may issue an electronic request to do automatic shopping through the application. Upon receiving the customer's request for automatic shopping, the analytic server 110 may generate a graphical user interface (GUI) that requires the user to associate with a shopping cart. For example, the analytic server 110 may activate the integrated camera of the electronic user device 140 for scanning a label 145 positioned on the shopping cart 150 (e.g., affixed to a surface of the shopping cart 150). By associating the customer's electronic user device 140 with an individual shopping cart 150 of a fleet of available shopping carts 150, the analytic server 110 may be able to determine who purchased the products in a specific shopping cart.

The weight sensors 130A on shelves and the weight sensors 130B on shopping carts 150 may be low-cost and, in an embodiment, tiny devices for detecting weight changes in the environment. The low-cost weight sensors 130A, 130B may have limited power and computation capability. The weight sensors 130A, 130B may collect data on weight changes and send the collected data to the analytic server 110. Transmitting collected data to the analytic server 110 may allow the data to be stored and processed at the analytic server 110, which may have more resources. In one embodiment, the weight sensors 130A, 130B send periodic updates to the analytic server 110. In another embodiment, communication of weight data is triggered by a detected change at the individual weight sensor 130 to conserve power.

The weight sensors 130A on shelves may be a group of spatially dispersed and dedicated sensors for monitoring the weight changes on the shelves of a shelving system 170. The weight sensors may be installed in specific sections of the shelves. Each shelf may hold different items 180 in specific sections. Therefore, each item may be associated with at least one weight sensor 130A. Specifically, based on the identifiers of the weight sensors 130A, the analytic server 110 may be able to determine the specific sections of the shelf where the weight sensors 130A are located. Based on the specific sections the weight sensors 130A located in, the analytic server 110 may be able to identify the items 180 placed in the specific sections. For example, one or more weight sensors 130 may be installed in aisle A, shelf B, bottom layer of shelf B, which may hold a soft drink item. When the customer picks up a case of the soft drink from the bottom layer of shelf B, the one or more weight sensors located in the specific section (e.g., bottom layer of shelf B) may detect the weight change (e.g., weight lifted from the shelf). Because the analytic server 110 knows that these weight sensors are installed in the section of shelf B where the soft drink is placed, the analytic server 110 may determine that the customer picks up a case of soft drink. Based on this process, the analytic server 110 may determine what items 180 are picked up from the shelves. In the embodiments disclosed herein, assuming the weight sensors on the shelves are granular enough to be associated with each kind of item, the analytic server 110 may be able to identify the exact items being pick up even if two items have the same weight.

The weight sensors 130B on each shopping cart may detect the weight addition to the shopping cart 150 when the customer places the item 180 in the shopping cart 150. The weight sensors 130B may transmit the weight addition data to the analytic server 110 upon detecting such weight addition. That is, the communication to the analytic server 110 by the weight sensors 130B (or communication circuitry coupled to the weight sensors 130B) may be triggered or activated responsive to detection of a change in weight in the total items 180 in the shopping cart 150. Since the shopping cart 150 is associated with the electronic user device 140 of the customer, the analytic server 110 may further associated the purchased items in the shopping cart 150 with the identifier of the customer. For example, when a weight sensor 130B on a shopping cart 150 transmits the weight addition, the analytic server 110 may identify that the weight sensor 130B is associated with a particular shopping cart X. Because the shopping cart X is associated with the electronic user device 140 of customer Y. The analytic server 110 may determine that customer Y purchases the items 180 in shopping cart X. Based on this process, the analytic server 110 may determine items are placed into which customer's shopping cart.

Furthermore, the analytic server 110 may correlate the customer with the items 180 picked up from the shelf and placed in the shopping cart 150. For example, the analytic server 110 may identify the customer picked up particular items 180 from the shelf and placed the items 180 in his/her cart 150. The analytic server 110 may track the customer's location within the store and determine which shelves or items 180 are within a proximity of the customer. For example, the analytic server 110 may determine that the customer is near the shelf holding sparkling water. When the customer picks up a case of sparkling water and places the case of sparkling water into his/her shopping cart 150, the analytic server may receive notifications relatively close together in time (e.g., within 10 seconds) from both the weight sensors 130A on the shelf holding the sparkling water and the weight sensors 130B on the customer's shopping cart. The notification from the weight sensors 130A on the shelf may comprise a negative weight change. The notification from the weight sensors 130B on the shopping cart may comprise a weight addition or a positive weight change. The analytic server 110 may compare the negative weight change and the weight addition. If they match, the analytic server 110 may determine that the customer has placed the item (e.g., sparkling water) into his/her shopping cart 150. The matching may include a correlation or match in magnitude of the weights, e.g., within a predetermined weight tolerance (less than a certain percentage difference between detected weights). In this process, the analytic server 110 may monitor the customer's location and determine the shelves/items the user has visited based on the customer's location, and further determine that the customer has placed the picked up items 180 in his/her shopping cart based on the location and identity of the sensor 130A, the disclosed weight matching, in embodiments, one or more location matching (the sensor 130A associated with proposed added item 180 is from a shelf close to the location of the customer shopping cart 150) and time matching (the elapsed time between the detection of the proposed added item 180 removal from the shelf and addition to the shopping cart 150 is less than a predetermined threshold).

The database 120 may be any non-transitory machine-readable media configured to store user data and weight sensor data. For example, the user data in database 120 may comprise the user's basic information including name, age, gender, zip code, email address, payment information (e.g., credit card information), and the like. The user data may also include the user's transaction history (e.g., previously purchased items), user preferences, and any other information about the user. The weight sensor data may include the information of assignment of the weight sensors 130A on the shelves in the store, such as the identifier of each weight sensor 130A, the location of the weight sensor 130A (e.g., the section of the shelf the weight sensor 130A is located in), the associated items of the weight sensor 130A. The database 120 may also include a store map comprising the locations of the shelves, and the arrangement of products/items placed on different sections of each shelf, the weight of each product/item. By combining the store map and weight sensor 130A assignment data, the analytic server 110 may be able to correlate the identifiers of the weight sensors 130A with the identifiers of the items 180 associated with each weight sensor 130A. For example, each weight sensor 130A may be located in a specific section of a shelf. The specific section of the shelf may hold a particular kind of items. Therefore, the items 180 on the particular section of the shelf may be associated with one or more weight sensors 130. Based on the identifier of each weight sensor 130A, the analytic server 110 may be able to identify the associated items on the shelf.

The database 120 may be part of the analytic server 110. The database 120 may be a separate component in communication with the analytic server 110. The database 120 may have a logical construct of data files, which may be stored in non-transitory machine-readable storage media, such as a hard disk or memory, controlled by software modules of a database program (e.g., SQL), and a database management system that executes the code modules (e.g., SQL scripts) for various data queries and management functions.

The analytic server 110 may keep tracking the customer's locations by periodically receiving location identification signals from the customer's electronic user device 140. The location identification signals may comprise a GPS identifier, beacon identifiers, low energy wireless signals, and the like. When the electronic user device 140 is within a predetermined proximity (e.g., a threshold value) of an exit of the store, the analytic server 110 may require the customer to make a payment to the merchant of the store in exchange of the purchased items. Specifically, the analytic server 110 may calculate the amount owned by the customer, indicate the amount, prepare an invoice for the customer, and indicate the options for the customer to make payment.

As discussed above, the analytic server 110 may be able to determine the identifiers of the items 180 picked up by the customer from the shelf and placed in the customer's shopping cart. The identifier of an item may correspond to a category of the item, attributes of the item, a price of the item, and the like. As a result, the analytic server 110 may be able to calculate the payment amount owed by the customer based on the price of each item in the shopping cart. The analytic server 110 may display an authentication prompt comprising the payment amount and a payment method retrieved from the user data. The analytic server 110 may display the authentication prompt on the customer's electronic user device 140 via the automatic shopping application. The authentication prompt may comprise an interactive interface (e.g., a button) for the customer to decline or authorize the payment request. After the user authorizes the payment request, the analytic server 110 may transmit the payment amount from an account associated with the customer (e.g., customer's bank account) to an account of the merchant associated with the store.

Figure 2:
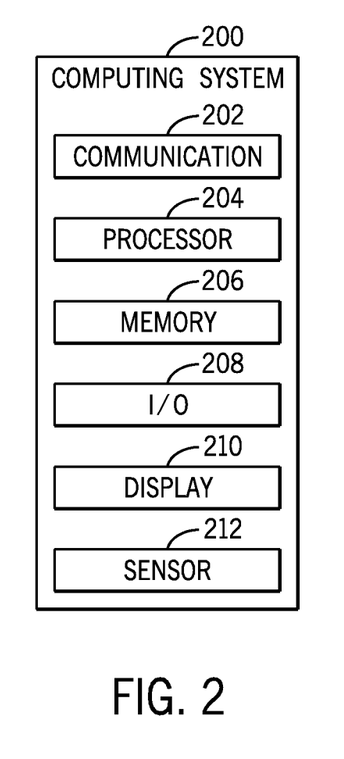
FIG. 2 illustrates a block diagram of components of the computer system for automatic shopping, according to an embodiment.

FIG. 2 is a block diagram that illustrates a computer system 200 that may be used in conjunction with the disclosed embodiments, such as the analytic server 110 and/or the electronic user device 140. The various illustrative logical blocks, modules, circuits, and algorithm steps described in connection with the embodiments disclosed here may be implemented in conjunction with one or more computing systems 200 that include electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The system. The computing system 200 may include communication circuitry 202, a processor 204, a memory 206, input/output devices 208, a display 210, and, in embodiments, a sensor 212.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. The memory 206 may be a non-transitory processor-readable storage media accessible by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality of the communication circuitry 202 may be include circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with the processor 204, which may include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one embodiment, the display 210 may be a touch display capable of receiving inputs from a user of the system 200. The display 210 may be any suitable type of display, such as a liquid crystal display (LCD), plasma display, or an organic light emitting diode (OLED) display, for example. Additionally, in one embodiment, the display 210 may be provided in conjunction with a touch-sensitive mechanism (e.g., a touch screen) that may function as part of a control interface for the system 200. The I/O devices 208 may be interfaces that may couple to other peripheral components such as input devices (e.g., keyboard, mouse), the sensors 212, input/output (I/O) modules, and the like. The sensor 212 may include an optical sensor, a camera, a barcode reader, a capacitive touch sensor, or an RF reader.

Figure 3:
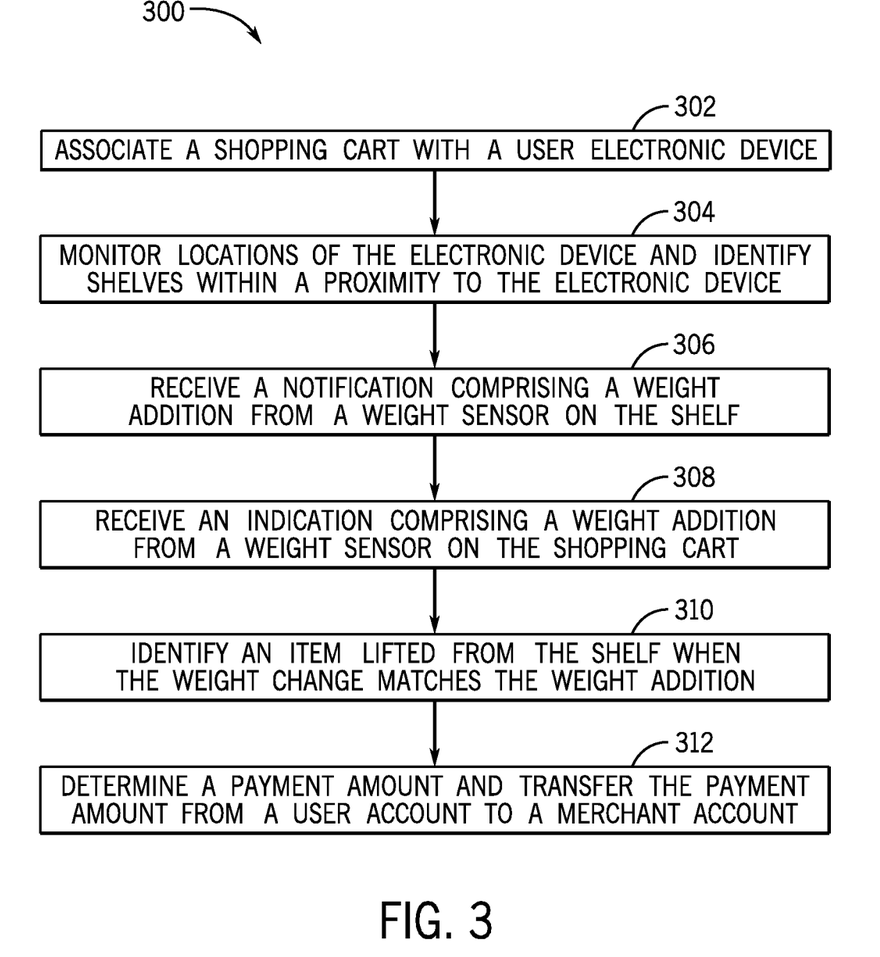
FIG. 3 illustrates a flowchart depicting operational steps for automatic shopping, according to an embodiment.

FIG. 3 illustrates execution of a method 300 for automatic shopping, according to an embodiment. Other embodiments may comprise additional or alternative steps, or may omit some steps altogether.

At step 302, the analytic server may associate a shopping cart of a store with a customer's electronic user device. When a customer comes to a store and launches the automatic shopping application on the electronic user device, the analytic server may generate a GUI that requires the customer to associate with a shopping cart. In some embodiments, the analytic server may also activate an integrated camera of the electronic user device. The customer may use the camera to scan a label on the shopping cart. The label of the shopping cart may comprise the identifier of the shopping cart. The identifier of the shopping cart may correspond to a barcode, a pin code, and a QR code. In some other embodiments, the analytic server may associate the electronic user device with the shopping cart based on the distance between them for a certain time period. For example, the analytic server may determine that the shopping cart is associated with the electronic device based on the location of the electronic user device being within a predetermined proximity to the shopping cart for a predetermined time. The shopping cart may have a beacon (e.g., Bluetooth beacon) installed on it that can transmit signals including the unique identifier associated with the shopping cart. The beacon signals may be received at short ranges (e.g., 3 meters). The electronic user device may be able to receive the beacon signals when it is within the predetermined proximity to the shopping cart. After a customer is close to a shopping cart for a certain time period (e.g., the customer's electronic user device has been receiving the beacon signals for a certain time period or a preset time threshold), the analytic server may determine that the customer is pushing that particular shopping cart and associate the customer's electronic user device with the shopping cart.

By associating the customer's electronic user device with a shopping cart, the analytic server may be able to determine who purchased the products in a specific shopping cart. Each shopping cart may comprise one or more weight sensors configured to sense a weight addition associated with each item placed within the shopping cart.

The automatic shopping application may be a web application (e.g., comprising a hyperlink of a website) and/or a mobile application installed in the electronic user devices. The customer may register with the automatic shopping application by inputting required information for the registration, such as the user name, user address, user payment methods (e.g., credit card information, billing address), user contact information (e.g., email address, phone number), and the like.

At step 304, the analytic server may monitor the locations of the electronic user device by periodically receiving location identification signals from the electronic user device. The location identification signals may be a GPS identifier, beacon identifiers, low energy wireless signals, and the like. When the customer moves around in the store, the analytic server may keep tracking the customer's locations. Based on the customer's location, the analytic server may identify the shelves within a predetermined proximity of the electronic user device (e.g., the shelves the customer has visited).

The shelf may have a set of weight sensors spatially dispersed and installed in different sections of the shelf. Each shelf may hold different items in specific sections. The set of weight sensors may be configured to detect a weight change upon each item on the shelf is lifted. Specifically, when an item is lifted from the shelf, at least one weight sensor from the set of weight sensors may detect the weight change. The weight sensor detecting the weight change may transmit a notification to the analytic server to notify the analytic server that an item is lifted from the shelf.

At step 306, the analytic server may receive a notification comprising an amount of weight change from a weight sensor on the shelf that the customer has visited. The notification may also comprise a timestamp for detecting such a weight change, and the identifier of the weight sensor detecting the weight change. The analytic server may be able to determine the identifier of the lifted item based on the sensor identifier and/or the amount of weight change. For example, the analytic server may maintain a map of the store comprising the locations of the shelves, the arrangements of the products/items placed on different sections of each shelf, and the weight of each product/item. The analytic server may also maintain a map of the weight sensor arrangement on different sections of each shelf. When the analytic server receives the notification from a specific weight sensor, the analytic server may determine the section of a specific shelf where the specific weight sensors is installed. Based on the section of the specific shelf, the analytic server may determine what product is placed in that section of the specific shelf. Furthermore, the analytic server may be able to confirm the identifier of the item/product based on the weight change. In the embodiments disclosed herein, assuming the weight sensors on the shelves are granular enough to be associated with each kind of item, the analytic server may be able to identify the exact items being pick up even if two items have the same weight.

For example, assuming the analytic server receives a notification from weight sensor M, the analytic server may determine that weight sensor M is installed in a section of shelf holding item N. As a result, the analytic server may determine that the notification from weight sensor M means that item N is lifted from the shelf. Furthermore, the analytic server may retrieve the weight of item N from the database and compare the weight of item N with the amount of weight change reported by weight sensor M to determine the number of such items being picked up.

In some embodiments, the weight sensors on the shelves may transmit an alert to the analytic server when there is a weight addition to a section of a shelf and the weight addition does not match the weight of item designated for that particular section. The mismatch may suggest that an item is misplaced. The analytic server may transmit the alert comprising the location of the shelf and the particular section to a staff (or a robot) of the store, so that the staff may return the misplaced item to its original position.

At step 308, the analytic server may receive an indication comprising an amount of weight addition from the weight sensor on the customer's shopping cart. After the customer picks up the item from the shelf and places the item into his/her shopping cart, the weight sensor on the shopping cart may detect the weight addition into the shopping cart. The shopping cart weight sensor may transmit the indication of the weight addition to the analytic server. The indication may comprise the amount of weight addition, a timestamp for detecting such a weight addition, and the identifier of the weight sensor on the shopping cart detecting the weight addition.

Based on the identifier of the weight sensor on the shopping cart, the analytic server may determine the identifier of the shopping cart. Because the shopping cart is associated with the customer, the analytic server may determine which customer's shopping cart has an item placed into it, and how much weight is the placed item. As a result, the analytic server may correlate the new item placed within a shopping cart with the customer associated with the shopping cart.

At step 310, the analytic server may compare the amount of weight change and the amount of weight addition. If they match, the analytic server may determine that the item picked up from the shelf that the customer has visited is placed within the customer's shopping cart. As a result, the analytic server may correlate the customer with the item picked up from the shelf and placed into the shopping cart. As discussed above, based on the section of the shelf where the weight sensor detecting the weight change is installed, the analytic server may be able to determine the identifier of the item being lifted from the shelf. Thus, the analytic server may determine the customer picked up what item from the shelf and placed the item into his/her cart. The identifier of an item may correspond to a category of the item, attributes of the item, a price of the item, and the like.

For example, the analytic server may determine that the customer is near the shelf holding sparkling water. When the customer picks up a case of sparkling water and places the case of sparkling water into his/her shopping cart, the analytic server may receive a notification from the weight sensor on the shelf and an indication from the weight sensor on the shopping cart. The notification may comprise a weight change and the indication may comprise a weight addition. If they match, the analytic server may determine that the customer has placed the item (e.g., sparkling water) into his/her shopping cart. In this process, the analytic server may monitor the customer's location and determine the shelves/items the user has visited based on the customer's location, and further determine that the customer's has placed certain items in his/her shopping cart based on the weight matching.

Furthermore, based on the timestamp in the notification of weight change and the timestamp in the indication of weight addition, the analytic server may determine how long it takes the customer to decide to purchase the item. For example, the timestamp in the notification of weight change may be the pick-up time indicating the time when the item is picked up from the shelf. The timestamp in the indication of weight addition may be the add-in time indicating when the item is placed into the shopping cart. Based on the pick-up time and add-in time, the analytic server may determine how long it takes the customer to decide to purchase the item. For example, if the difference between the pick-up time and add-in time is five minutes, the analytic server may determine that the customer takes five minutes to make his/her decision to purchase the item. The analytic server may add such information into a user profile. As a result, the user profile may comprise the identifier of the item, the pick-up timestamp, the add-in timestamp, and the amount of time for deciding to purchase the item.

At step 312, the analytic server may determine a payment amount and transfer the payment amount from a user account to a merchant account when the customer is leaving the store. In operation, the analytic server may keep tracking the locations of the customer by periodically receiving location identification signals from the customer's electronic user device. When the electronic user device is within a predetermined proximity (e.g., a threshold value) of an exit of the store, the analytic server may require the customer to make a payment to the merchant of the store in exchange of the purchased items. Specifically, based on the identifiers of the items placed in the customer's shopping cart, the analytic server may retrieve the price of each item and calculate the payment amount for all the items in the shopping cart.

In some embodiments, the analytic server may determine that the customer is ready to check out based on both the locations of the customer and the locations of the shopping cart. More specifically, the analytic server may determine that the customer is ready to check out when the customer is pushing the associated shopping cart to the exit of the store. In operation, the analytic server may keep tracking the locations of the customer by periodically receiving the location identification signals from the customer's electronic user device. When the electronic user device is within the predetermined proximity of the exit of the store, the analytic server may further check whether the electronic user device is within a short range of the shopping cart. For example, the analytic server may check whether the electronic user device is receiving the beacon signals from the shopping cart. If the electronic user device is receiving the beacon signals, the analytic server may determine that the customer is pushing the shopping cart to the exit, and require the customer to make a payment. If the electronic user device is not receiving the beacon signals, the analytic server may determine that the customer may hand his/her device to somebody who steps outside the store or the customer is going out of the store with his/her device. However, the customer is not take the shopping cart with him/her and is not ready to check out.

In some configurations, the shopping cart may also include a scanner to scan a universal product code (e.g., barcode or QR code) of the items placed into the shopping cart. The analytic server may activate the scanner and use the scanned universal product codes as a secondary verification to ensure that the items within the shopping cart are correctly identified. This secondary verification method could also ensure that the correct product is charged to the customer, limiting incorrect billing and potential loss for the store.

The analytic server may display an authentication prompt on the customer's electronic user device via the automatic shopping application. The authentication prompt may comprise an interactive interface (e.g., a button) for the customer to decline or authorize the payment request. After the user authorizes the payment request, the analytic server may transmit the payment amount from an account associated with the customer (e.g., customer's bank account) to an account of the merchant associated with the store.

In some embodiments, the analytic server may display multiple payment methods in the authentication prompt, such as a debit account, a credit account, a saving account, a checking account, an investment account, a reward points account, and the like. The customer may have provided such account information during the registration process. The customer may select one of the accounts as a preferred default account. In the payment authorization process, the customer may select one of the accounts to pay for the purchased items. If the user does not select any account, the analytic server may charge the default account. In implementation, the analytic server may transmit the payment amount from the customer's account to an account of the merchant associated with the store.

Furthermore, the analytic server may update the customer's transaction history in the user profile. The analytic server may determine the user preferences based on the user profile including historical data of items purchased by the customer. For example, the analytic server may determine the user preferences based on the items and/or brands of the items the customer purchased for multiple times. In another example, the analytic server may determine that the customer purchases a certain product periodically (e.g., every two weeks) based on the customer historical data. Based on the schedule of buying a certain product, the analytic serve may generate a reminder for the customer periodically. In addition, the analytic server may determine the user preferences based on other similar users' historical data. For example, the analytic server may identify a group of existing users sharing one or more attributes with the customer and predict the user preferences based on the similar users historical data.

The analytic server may utilize artificial intelligence (AI) algorithms to determine and predict the user preferences. Specifically, the analytic server may apply predictive modeling techniques, including but are not limited to, neural networks (NNs), support vector machines (SVMs), decision trees, linear and logistic regression, clustering, association rules, and scorecards, to learn the patterns hidden in large volumes of historical data. When learning is completed, the result is a prediction model, which may be able to generalize the knowledge it learned and apply the knowledge to a new situation. For example, after the analytic server learned the pattern of similar users' transaction history, such as the preferences of existing users similar to the specific customer. The analytic server may apply the knowledge to predict the customer's preferences. The analytic server may launch target advertisement or promotion based on the user preferences.

Non-Limiting Example

In a non-limiting example, when the customer comes to a store and launches the automatic shopping application installed on his/her electronic user device, the analytic server may require the customer to associated the electronic user device with a shopping cart. The customer may use the electronic user device to scan a QR code on the shopping cart to associate with the shopping cart. As the customer walks around in the store, the analytic server may monitor the locations of the customer based on the GPS signals on the electronic user device and identify the shelves the customer visited. When the customer comes to a shelf holding sparkling water and picks up a case of sparkling water, the analytic server may receive a notification from the weight sensor installed on that section of the shelf. When the customer places the case of sparkling water into his/her shopping cart, the analytic server may receive an indication of weight addition from the shopping cart weight sensor. If the amount of weight change matches the amount of weight addition, the analytic server may determine that the user picks up the sparkling water and places it into his/her shopping cart. The analytic server may determine a payment amount based on prices of items within the shopping cart. The analytic server may transfer the payment amount from a user account to a merchant account when the customer is leaving the store.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
receiving, by an electronic device, beacon signals from a shopping cart of a store, wherein the shopping cart and the electronic device are within a first predetermined proximity;
determining that the beacon signals are received by the electronic device during a preset time threshold;
associating, by a server, the shopping cart with the electronic device responsive to determining that the electronic device received the beacon signals from the shopping cart during the preset time threshold, wherein the shopping cart comprises a first weight sensor configured to detect a weight addition;
monitoring, by the server, locations of the electronic device by periodically receiving, from the electronic device, location identification signals;
accessing a map from a database, wherein the map comprises locations of shelves of a shelving system, an arrangement of items of an item system, and a weight of the items of the item system;
identifying, by the server, a shelf of the shelving system holding one or more items located within a second predetermined proximity of the electronic device based on the locations of the electronic device and the map, wherein the shelf comprises a set of second weight sensors installed in different sections of the shelf and configured to detect a weight change upon each item on the shelf is lifted;
receiving, by the server, a notification comprising an amount of weight change from a second weight sensor within the set of second weight sensors, wherein the amount of weight change is associated with an item being lifted from the shelf,
receiving, by the server, an indication comprising an amount of weight addition from the first weight sensor;
when the amount of weight change matches the amount of weight addition, confirming, by the server, an identifier of the item being lifted from the shelf based on the section of the shelf where the second weight sensor is installed based at least in part on the map, wherein the server determines that the item being lifted from the shelf is placed within the shopping cart;
determining, by the server, a check out status based on a third proximity of the electronic device to an exit of the store using the locations of the electronic device and based on the electronic device receiving the beacon signals from the shopping cart, wherein the check out status is ready to check out when the electronic device is within the third predetermined proximity of the exit and when the electronic device is receiving the beacon signals from the shopping cart;
determining, by the server, a payment amount based on identifiers of items placed within the shopping cart based on determining the ready to check out status; and
transmitting, by the server, the payment amount from a first account associated with a user operating the electronic device to a second account of a merchant associated with the store.

2. The method of claim 1, wherein the server monitors the electronic device by periodically receiving location identification signals.

3. The method of claim 1, wherein the identifier of the identified item corresponds to at least one of a category of the identified item, attributes of the identified item, and a price of the identified item.

4. The method of claim 1, further comprising:
comparing, by the server, the amount of weight change with a weight of the identified item, wherein the amount of weight change is based on signal from at least two weight sensors; and
determining, by the server, a number of the item being picked up from the shelf.

5. The method of claim 1, further comprising:
displaying, by the server, an authentication prompt comprising a plurality of payment methods, each payment method corresponding to a different account;
receiving, by the server, a selected payment method from the electronic device; and
transmitting, by the server, the payment amount from an account corresponding to the selected payment method.

6. The method of claim 1, further comprising:
determining, by the server, user preferences based on historical data of items purchased by the user, wherein the items comprise one or more periodic purchases by the user.

7. The method of claim 1, further comprising:
determining, by the server, user preferences based on historical data of a group of existing users who share one or more attributes with the user.

8. A system, comprising:
a plurality of shopping carts, each individual shopping cart of the plurality comprising:
a unique identifier; and
at least one weight sensor;
a shelving system comprising shelf weight sensors spatially distributed about shelves of the shelving system;
a map comprising locations of shelves of the shelving system, an arrangement of items of an item system, and a weight of items of the item system, wherein the map is stored in a database; and
a controller in communication with an electronic device of a user and the database, the controller configured to:
access the map from the database;
determine the electronic device is receiving beacon signals from an individual shopping cart of the plurality of shopping carts within a predetermined proximity, wherein the beacon signals comprise the unique identifier of the individual shopping cart of the plurality of shopping carts;
determining that the electronic device is receiving the beacon signals over a preset time threshold;
associate the electronic device with the unique identifier of the individual shopping cart of the plurality of shopping carts based on the electronic device receiving the beacon signals in the predetermined proximity and over the preset time threshold;
determine user preferences based on a user profile of the user, wherein the user profile comprises one or more products determined to be purchased periodically by the user;
receive a detected increase in weight from the at least one weight sensor of the individual shopping cart;
receive a detected decrease in weight from a shelf weight sensor;
associate an item with the individual shopping cart of the user based at least in part on a correlation between the detected increase in weight and the detected decrease in weight;
confirm an identifier of the associated item with the individual shopping cart based at least in part on determining that the detected decrease in weight from the shelf weight sensors originates from a shelf location of the shelving system associated with the item using the map; and
determine a check out status based on a location of the electronic device being within a predetermined proximity to an exit of a store and based on the electronic device receiving the beacon signals from the individual shopping cart, wherein the check out status is ready to check out when the electronic device is within the predetermined proximity of the exit and when the electronic device is receiving the beacon signals from the individual shopping cart;
determine a payment amount based on identifiers of items placed within the shopping cart in response to determining the check out ready status; and
transmit the payment amount from a first account associated with the user to a second account of a merchant associated with the store.

9. The system of claim 8, wherein the controller is configured to associate the item with the individual shopping cart of the user further based on a location match between the shelf weight sensor and the individual shopping cart.

10. The system of claim 8, wherein the controller is configured to associate the item with the individual shopping cart of the user further based on the detected increase in weight and the detected decrease in weight occurring within a predetermined time window.

11. The system of claim 8, wherein the at least one weight sensor is coupled to wireless communication circuitry to transmit the detected increase in weight to the controller.

12. A system, comprising:
a plurality of shelf weight sensors distributed about shelves of a shelving system, wherein an individual shelf weight sensor is configured to transmit a first signal upon a change in detected weight;
a shopping cart comprising a weight sensor configured to transmit a second signal upon a change in detected weight;
a map comprising locations of the shelves of the shelving system, an arrangement of items of an item system, and a weight of the items of the item system, wherein the map is stored in a database; and
a controller in communication with an electronic device of a user and the database, the controller being configured to:
determine the electronic device is receiving beacon signals from the shopping cart within a first predetermined proximity over a period of time;
associate the shopping cart with the electronic device based on the electronic device receiving the beacon signals in the first predetermined proximity and in response to the period of time being greater than a preset time threshold;
receive the first signal and the second signal;
correlate the first signal and the second signal based on a match in a magnitude of the detected weight change;
associate an item with the shopping cart based at least in part on the correlation, wherein the magnitude is associated with the item;
access the map from the database;
confirm an identifier of the associated item with the shopping cart based at least in part on determining that the first signal of the individual shelf weight sensor originates from a shelf location of the shelving system associated with the item using the map;

determine a check out status based on a location of the electronic device being within a second predetermined proximity to an exit of a store and based on the electronic device receiving the beacon signals from the shopping cart, wherein the check out status is ready to check out when the electronic device is within the second predetermined proximity of the exit and when the electronic device is receiving the beacon signals from the shopping cart;

determine a payment amount based on identifiers of items placed within the shopping cart in response to determining the check out ready status; and transmit the payment amount from a first account associated with the user to a second account of a merchant associated with the store.

13. The system of claim 12, wherein the controller is configured to associate additional items with the shopping cart based on additional signals from the plurality of shelf weight sensors and the weight sensor of the shopping cart.

14. The method of claim 1, wherein the associating comprises receiving a signal from the electronic device indicative of a scanned identifier of the shopping cart.

15. The method of claim 1, further comprising:
designating, by the server, a weight of items on the shelf;
receiving, by the server, a notification comprising an added weight from the second weight sensor within the second set of weight sensors, the added weight change associated with an item being placed onto the shelf; and
determining, by the server, a misplaced item on the shelf based on the added weight not matching the weight of item designated for that shelf.

16. The method of claim 15, further comprising:
transmitting, by the server, an alarm indicating the misplaced item, wherein the alarm comprises a location of the shelf and the section of the shelf.

17. The system of claim 8, the controller is configured to create a schedule based on the one or more products purchased periodically and generate a reminder based on the schedule.

18. The system of claim 12, wherein the controller is configured to:
associate a first timestamp with the first signal upon a change in detected weight in the plurality of shelf weight sensors;
associate a second timestamp with the second signal upon a change in detected weight in the shopping cart; and
determine a time delay between the first timestamp and the second timestamp indicating an amount of time to choose the item.

19. The system of claim 18, wherein the controller comprises a memory storing a user profile associated with the shopping cart and wherein the controller is configured to add an identifier of the item, the first timestamp, the second timestamp, and the time delay to the user profile.

20. The method of claim 1, wherein the check out status is determined to be not ready when the electronic device is within the third predetermined proximity of the exit and when the electronic device is not receiving the beacon signals from the shopping cart, wherein the payment amount is not determined when the check out status is not ready.

21. The system of claim 8, wherein each individual shopping cart of the plurality of shopping carts comprises a beacon configured to transmit the beacon signals comprising a unique identifier associated with the individual shopping cart.

* * * * *